United States Patent [19]

Nishimura et al.

[11] Patent Number: 4,741,721
[45] Date of Patent: May 3, 1988

[54] DAMPER DISC

[75] Inventors: Yoshio Nishimura, Neyagawa; Syogo Ohga, Osaka, both of Japan

[73] Assignee: Kabushiki Kaisha Daikin Seisakusho, Osaka, Japan

[21] Appl. No.: 932,838

[22] Filed: Nov. 20, 1986

Related U.S. Application Data

[62] Division of Ser. No. 836,369, Mar. 5, 1986.

[30] Foreign Application Priority Data

Mar. 6, 1985 [JP] Japan .................. 60/44300

[51] Int. Cl.⁴ .................. F16D 3/14; F16D 3/64
[52] U.S. Cl. .................. 464/68; 192/106.1; 192/106.2
[58] Field of Search .............. 192/106.2, 106.1, 70.17; 464/68, 64, 66

[56] References Cited

U.S. PATENT DOCUMENTS

| | | | |
|---|---|---|---|
| 3,948,373 | 4/1976 | Worner | 192/106.2 |
| 4,533,031 | 8/1985 | Nagano | 192/106.2 |
| 4,562,912 | 1/1986 | Kabayama | 192/106.2 |
| 4,569,430 | 2/1986 | Raab et al. | 192/106.2 |
| 4,577,743 | 3/1986 | Raab et al. | 192/106.2 |

FOREIGN PATENT DOCUMENTS

| | | | |
|---|---|---|---|
| 45-27488 | 9/1970 | Japan | 192/106.2 |
| 55-12598 | 3/1980 | Japan . | |
| 1428557 | 3/1976 | United Kingdom | 192/106.2 |

*Primary Examiner*—Rodney H. Bonck
*Attorney, Agent, or Firm*—Armstrong, Nikaido, Marmelstein & Kubovcik

[57] ABSTRACT

A damper disc, in which first friction washers for generating a large hysteresis torque are provided on opposite sides of a flange of a spline hub and a substantially annular disc-like intermediate member is provided so as to be pressed on an outside of a friction washer. A projection projecting toward a side plate is formed on the intermediate member. The projection is fitted into the side plate in such a manner that the intermediate member and side plate can slide freely with respect to each other within a specified torsion angle. A second friction washer generating a small hysteresis torque is provided between the intermediate member and the side plate.

2 Claims, 3 Drawing Sheets

FIG. 1
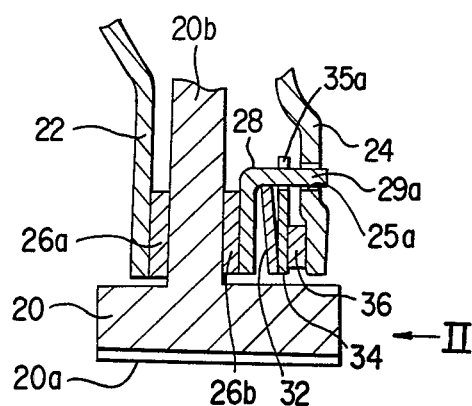
FIG. 3
FIG. 2
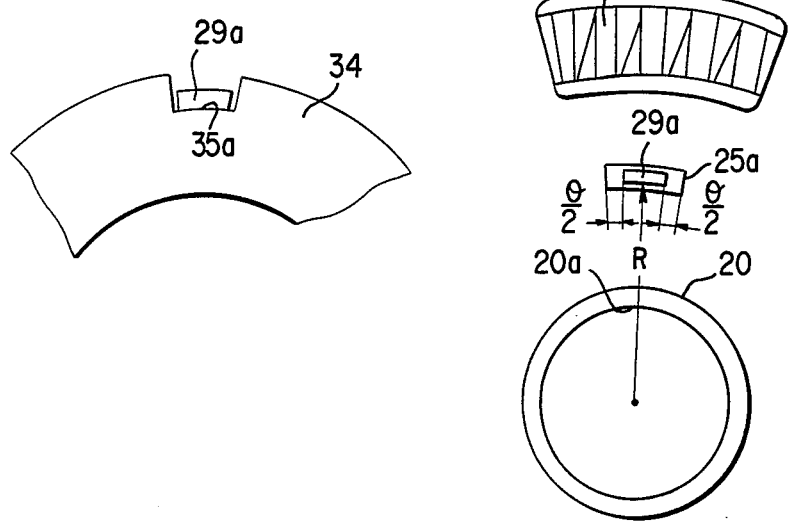

DAMPER DISC

This is a division of application Ser. No. 836,369, filed Mar. 5, 1986.

BACKGROUND OF THE INVENTION

1. Industrial Useful Field

This invention relates to an improvement in a damper disc for increasing and decreasing a hysteresis torque generated in accordance with a change of torsion angle.

2. Prior Art

Utility Model No. 55-12598 has conventionally been known as a clutch or damper disc for increasing and decreasing hystersis torque. In this conventional embodiment, two friction washers 12 are mounted on spline hub 10 mounted on, therebetween. Friction plates 14 are pressed by a cone spring 15 on the external sides of friction washers 12 respectively. Projections 14a are formed on inner peripheral parts of the friction plates 14, as shown in FIG. 7 hereof. Projections 14a fit into two side plates 16 in such a manner that they can slide freely relative to each other within a specified torsion angle. A small hysteresis torque is generated by the friction plates 14 within a small torsion angle at which the side plates 16 and the friction plates 14 are slidable relative to each other. A large torsion torque is generated by the friction plates 14 and the friction washers 12 when the torsion torque becomes large.

In the above-mentioned conventional embodiment, however, a large force applied on the projection 14a lessens the strength of the projection 14a because the projection 14a is provided at the inner peripheral part of member 14. Further, since it is necessary to form a notch 16a for passing through the projection 14a on the side plate 16, a deviated wear on a contact surface between the friction plate 14 and the side plate 16 is apt to occur. A specified hysteresis torque can not be obtained if such wear occurs.

Further, in the case of the construction illustrated in FIG. 7, the small torsion angle can generate only a minimum hysteresis torque so that obtainable characteristics are limited. Therefore, in case when a comparatively large hysteresis torque of about 50% of the large torsion angle, for example, is required even in the small torsion angle range, the required hysteresis characteristics can not be obtained.

Object of the Invention

A first object of the present invention is to overcome the above-mentioned problem. A further object thereof is to make it possible to obtain a desired hysteresis characteristic by means of a difference of contact area of an intermediate member.

In order to accomplish the first object, in this invention, first friction washers generating a large hysteresis torque are provided on opposite sides of a flange of a spline hub having a spline internal tooth. An approximately annular disc-like intermediate member is provided so as to be pressed onto the outside of at least one of the friction washers. A projection projecting toward a side plate is formed on a radially outer peripheral part of the intermediate member. The projection is fitted into the side plate in such a manner that they can slide freely relative to each other within a specified torsion angle. A second friction washer generating a small hysteresis torque of provided between the intermediate member and the side plate.

In order to accomplish a desired hysteresis characteristic by means of a difference of contact area of the intermediate member, the first friction washers generating a large hysteresis torque and are provided on opposite sides of the flange of at least one hub having a spline internal tooth. An approximately annular disc-like intermediate member made of a friction material is pressed on an outside of at least one of the friction washers. A projection projecting toward a side plate is formed on a radially outer peripheral part of the intermediate member, the projection being fitted into the side plate in such a manner that the intermediate member and side plate can slide freely relatively to each other within a specified torsion angle. A first contact face having a large area is formed on a face at the first friction washer side of the intermediate member. A second contact face having a small area is formed on a face at the side plate side of the intermediate member.

BRIEF DESCRIPTION OF THE DRAWINGS

FIG. 1 is a vertical sectional partial view showing a clutch disc of a first embodiment of the invention.

FIG. 2 is a figure viewed in a direction of arrow II of FIG. 1.

FIG. 3 is a partial plan view of a sub-friction plate.

DETAILED DESCRIPTION OF THE INVENTION

Embodiment 1

Figure 4:
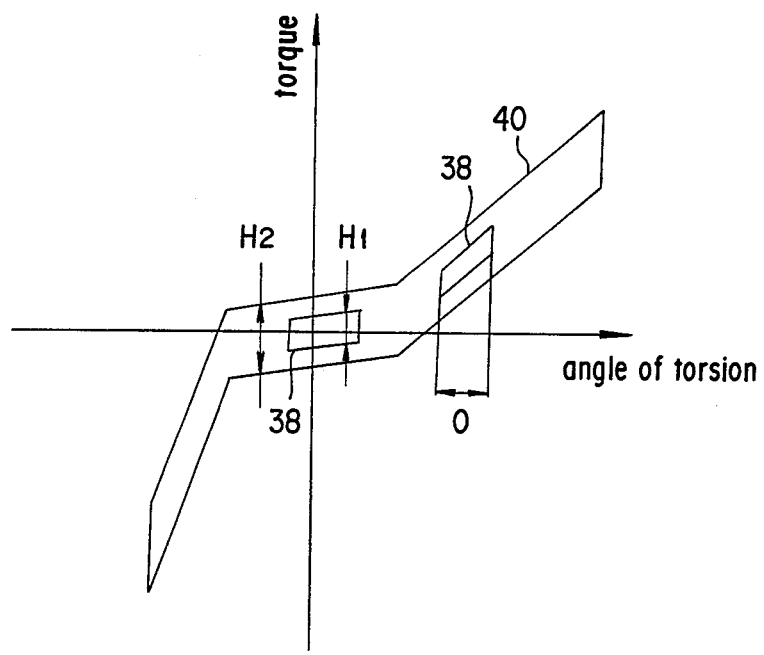
FIG. 4 is a graph slowing a hysteresis torque characteristic of the first embodiment.

In FIG. 1 showing the invention is applied to a clutch disc for automobile, 20 is a spline hub. A spline internal tooth 20a of the spline hub 20 spline fits onto an input shaft (not shown) of a speed changer. An approximately annular clutch plate 22 and a retaining plate 24 forming side plates of the clutch are provided on opposite sides of flange 20b of the spline hub 20 with a specified distance kept therebetween. A facing (not shown) pressing on a flywheel (not shown) of an engine is fixed through a cushioning plate (not shown) to an outer peripheral part of the clutch plate 22. The clutch plate 22 and the retaining plate 24 are held to the flange 20b at their outer peripheral parts through torsion springs (not shown) in such a manner that they can slide freely circumferentially of each other within a specified torsion angle.

Annular first friction washers 26a and 26b press on the opposite side faces of flange 20b. First friction washers 26a and 26b have a comparatively large friction coefficient and are formed of such a material that exerts a large hysteresis torque of about 2 kg.m which is suitable for absorbing a torson torque at the time of engaging and disengaging of the clutch.

Clutch plate 22 presses on an external end face of first friction washer 26a. A friction plate 28, or intermediate member, presses on an external end face of the first friction washer 26b. The friction plate 28 is formed into an approximately annular disc-like shape. Projections 29a, bent toward the retaining plate 24, are formed on circumferential four places, for example, of an outer peripheral part of the friction plate 28 with equal spaces left therebetween.

The projections 29a fit in holes 25a of the retaining plate 24, as shown in FIG. 2 in such a manner that they can slide freely of the retaining plate in their circumferential direction. When an allowable sliding angle is designated as $\theta$, clearances $\theta/2$ are provided on both sides of the projection 29a. Therefore, under a state wherein the projection 29a is pressed against either end of the hole 25a, the projection 29a can slide freely in the reverse direction within an angle of about 2°~3° for example, FIG. 2 30 is a torsion spring.

As illustrated in FIG. 1, a cone spring 32, a subfriction plate 34 and a second friction washer 36 are interposed in this sequential order from inside between the friction plate 28 and the retaining plate 24. The cone spring 32 presses the sub-friction plate 34 and the second friction washer 36 against a side of the retaining plate 24 and presses the friction plate 28 and the first friction washer 26b against a side of the flange 20b.

The sub-friction plate 34 has a notch 35a at its outer peripheral edge as shown in FIG. 3, and is adapted to slide integrally with the friction plate 28 by fitting the projection 29a in the notch 35a.

The second friction washer 36 is formed of a material having a comparatively small friction coefficient, and is adapted to generate a small hysteresis torque of about 0.5 kg.m, for example, which is suitable for absorbing an engine torque fluctuation.

Function of the Invention

First, in case when a torsion having a small torsion angle of below the allowable sliding angle $\theta$ is generated by the engine torque fluctuation, the projection 29a of the friction plate 28 can slide freely in relation to the hole 25a of the retaining plate 24. A torsion torque from the retaining plate 24 is not transmitted to the friction plate 28 and hysteresis torques are generated between the retaining plate 24 and the second friction washer 36 and between the clutch plate 22 and the first friction washer 26a.

Therefore, within such a small torsion angle as the allowable sliding angle $\theta$ as shown in FIG. 4, a hysteresis characteristic shown by a first stage characteristic 38 is exerted. A hysteresis torque H1 of the first stage characteristic 38 becomes a hysteresis torque as large as 2.5 kg.m which is a sum of a hysteresis torque of 2 kg.m generated by the first friction washer 26a and that of 0.5 kg.m generated by 36.

In case, for example, when a large torsion angle of above the allowable sliding angle $\theta$ is generated at the time of such as engaging and disengaging the clutch, the projection 29a strikes against the end of the hole 25a and the retaining plate 24 slides integrally with the friction plate 28, so that the hysteresis torque is not generated at the second friction washer 36 but generated at both the first friction washers 26a and 26b.

Under this state, a hysteresis torque H2 as large as 4 kg.m is generated and is the sum of a hysteresis torque of 2 kg.m generated by the first friction washer 26a and that of 2 kg.m generated by the first friction washer 26b.

Consequently, within the range of small torsion angle of below the allowable sliding angle $\theta$ caused by the engine torque fluctuation, a torque fluctuation is absorbed by the hysteresis torque H1 as large as about 60% of the hysteresis torque H2.

Further, the torque from the retaining plate acts on the projection 29a at a torsion angle of above the allowable sliding angle $\theta$. However, since the projection 29a is formed on an outer peripheral part of the friction plate 28 which is positioned at a radius R, a load applied on the projection 29a will be decreased as compared with a conventional case where the projection 29a is provided at an inner peripheral part of the friction plate 28.

Moreover, the first friction washers 26a and 26b and the second friction washer 36 contact with the clutch plate 22, the retaining plate 24, the flange 20b and the sub-friction plate 34 over the entire circumferences thereof, so that no deviated wear will occur and a stable hysteresis torque characteristic will be obtainable over a long period.

Embodiment 2

Figure 5:
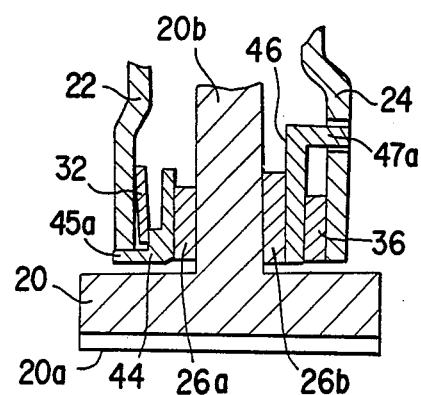
FIG. 5 is a vertical sectional partial view showing a clutch disc of a second embodiment applied with the first invention.

The second embodiment of the invention is described hereunder with reference to FIG. 5.

In FIG. 5, a part attached with the same symbol as FIG. 1 shows the same as or equivalent to a corresponding part of FIG. 1.

In FIG. 5, the first friction washer 26a, a friction plate 44 and the cone spring 32 are interposed in this sequential order from inside between the flange 20b and the clutch plate 22. Projections 45a are formed on an inner peripheral part of the friction plate 44 at circumferential four places for example, and the projections 45a fit in the clutch plate 22 so as to be permitted sliding integrally therewith.

The first friction washer 26b, the sub-friction plate 46, or intermediate member, and the second friction washer 36 are interposed in this sequential order from inside between the flange 20b and the retaining plate 24. Projections 47a are formed on an outer peripheral part of the sub-friction plate 46 at circumferential four places for example. The projections 47a fit into the retaining plate 24 so as to slide freely at the allowable sliding angle $\theta$ in the same manner as the projection 29a of the first embodiment.

In this second embodiment, the friction plate 44 slides integrally with the clutch plate 22 and the retaining plate 24 but the sub-friction plate 46 does not slide within a small torsion angle of below the allowable sliding angle $\theta$. The same hysteresis characteristic as the first stage characteristic 38 of FIG. 4 is obtainable.

Further, also at a large torsion angle of above the allowable sliding angle $\theta$, the same hysteresis characteristic as the second stage characteristic 40 of FIG. 4 is obtainable.

Embodiment 3

Figure 6:
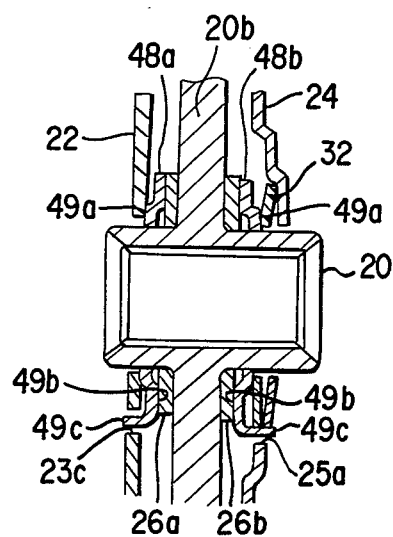
FIG. 6 is a vertical sectional partial view showing a clutch disc of a further embodiment applied to the second embodiment.
Figure 7:
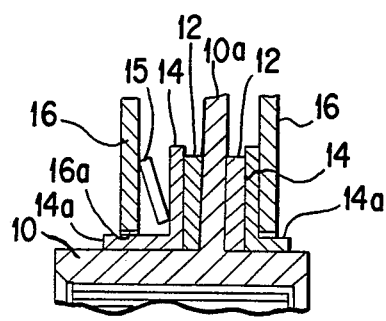
FIG. 7 is a vertical sectional partial view showing a conventional embodiment.

The third embodiment applied with the second invention will be described hereunder with reference to FIG. 6. In FIG. 6, a part attached with the same symbol as FIG. 1 shows the same as or equivalent to a corresponding part of FIG. 1.

In FIG. 6, the first friction washer 26a and a friction plate 48a, or intermediate member, are interposed in this sequential order from inside between the flange 20b and the clutch plate 22. The friction plate 48a is formed, for example, of a friction material such as DU material and has an approximately annular shape.

A second contact face 49a, which is bent by means of press work, for example, toward the clutch plate 22 to be pressed on an inner face of the clutch plate 22, is formed on an inner peripheral part of the friction plate 48a. The second contact face 49a is set to a comparatively small area. A first contact face 49b pressing on the first friction washer 26a is formed on a radially external side of the second contact face 49a. The first contact face 49b is sent to a large area, for example, about three times as large as the second contact face 49a. Further, projections 49c are formed at circumferential four places for example, on a radially external side of the first contact face 49b. The projections 49a fit in holes 23c of the clutch plate 22 so as to be permitted sliding within the allowable sliding angle $\theta$ in the same manner as the projection 29a of the first embodiment.

The first friction washer 26b, a friction plate 48b, or intermediate member, and the cone spring 32 are interposed in this sequential order from inside between the flange 20b and the retaining plate 24. The friction plate 48b has the same shape and material as the friction plate 48a. Projections 49c of the friction plate 48b fit into holes 25a of the retaining plate 24 so as to be permitted sliding within the allowable sliding angle $\theta$ in the same manner as the projection 29a of the first embodiment.

The cone spring 32 presses the friction plate 48b and the first friction washer 26b against the flange 20b. An inside inner peripheral part of the cone spring 32 presses on the second contact face 49a of the friction plate 48b. The first contact face 49b presses on the first friction washer 26b, too.

In this third embodiment; comparatively small hysteresis torques are generated between the cone spring 32 and the second contact face 49a of the friction plate 48b and between the clutch plate 22 and the second contact face 49a of the friction plate 48a, within a small torsion angle of below the allowable sliding angle $\theta$. Large hysteresis torques are generated between the first contact faces 49b of the both friction plates 48a and 48b and the first friction washers 26a and 26b, at a large torsion torque of above the allowable sliding angle $\theta$.

Effect of the Invention

In the damper disc of the first invention as described above, the first friction washers generating the large hysteresis torque are provided on both sides of the flange of the spline hub having the spline internal tooth. The approximately annular disc-like intermediate member is provided so as to be pressed on the outside of at least one of the both friction washers. A projection projecting toward the side plate is formed on the radially outer peripheral part of the intermediate member, the projection being made fit in the side plate into such a manner that they can slide freely relative to each other within a specified torsion angle. The second friction, washer generating the small hysteresis torque is provided between the intermediate member and the side plate. Therefore, the following effects become obtainable.

The projections 29a and 47a of the friction plate 28 (FIG. 1) and the sub-friction plate 46 (FIG. 5), both being the intermediate member, are formed on their outer peripheral parts so that, when the same torque is transmitted, the radius R can be made larger than a conventional radius to provide a decrease in loads applied on the projections 29a and 47a and an improvement in strengths of the projections 29a and 47a.

The first friction washers 26a and 26b and the second friction washer 36 press on the clutch plate 22, the retaining plate 24 and the cone spring 32 over their entire circumferences. The magnitudes of the hysteresis torques H1 and H2 become stable and there is no possibity of occurence of the deviated wear even after a long period of use.

In the damper disc of the second embodiment, the approximately annular disc-like intermediate member made of the friction material is provided. The projection projecting toward the side plate is formed on the radially outer peripheral part of the intermediate member, the projection being made fit into the side plate in such a manner that they can slide freely relative to each other within the specified torsion angle. The first contact face having the large area is formed on the face at the first friction washer side of said intermediate member, and the second contact face having the small area is formed on the face at the side plate side of said intermediate member. Therefore, the following effects become obtainable in addition to those of the first embodiment.

First, the magnitudes of the hysteresis torques H1 and H2 are determined by the difference between the area of the second contact face 49a and the area of the first contact face 49b of between the friction plates 48a and the friction plate 48b, so that the magnitude of the hysteresis torques H1 and H2 can be set exactly.

Moreover, since components interposed between the flange 20b and the clutch plate 22 and the retaining plate 24 are only the first friction washer 26a and 26b, the friction plates 48a and 48b and the cone spring 32; a quantity of component becomes small to provide a simple construction as compared with the conventional embodiment and the first and second embodiments.

Other embodiment (1) The present invention is applicable not only to the clutch disc as described in the above embodiments but to a damper disc for an automatic transmission.

What is claimed is:

1. A damper disc, having a hub, said hub having at least one internal spline tooth and a radially extending flange, first friction washers for generating a large hysteresis torque on opposite sides of said flange, a substantially annular disc-like intermediate member pressed on a side of at least one of said first friction washers opposite to said flange, side plates on said hub, a projection on a radially outer peripheral part of said intermediate member projecting toward one of said side plates, said projection fitting into said one of said side plates so that said intermediate member and said one of said side plates can slide freely relatively to each other within a specified torsion angle, said intermediate member having an annular stepped shape having stepped inner and outer annular peripheral portions, said stepped inner annular peripheral portion projecting toward said side plate side of said intermediate member forming a relatively small friction contact area with said side plate, and said stepped outer annular peripheral portion of said intermediate member projecting toward said one of said first friction washers and forming a relatively large friction contact area with said one of said first friction washers.

2. A damper disc as set forth in claim 1, in which annular stepped intermediate members are provided on opposite sides of said flange, and a cone spring is compressively installed between said second contact face of said one intermediate member and said one of said side plates.

* * * * *